(12) United States Patent
Liu et al.

(10) Patent No.: US 11,884,423 B2
(45) Date of Patent: Jan. 30, 2024

(54) METHOD FOR TASK PLANNING OF SPACE INFORMATION NETWORK BASED RESOURCE INTERCHANGE

(71) Applicant: Xi'an University of Architecture and Technology, Xi'an (CN)

(72) Inventors: Runzi Liu, Xi'an (CN); Xiang Ji, Xi'an (CN); Wenzhu Zhang, Xi'an (CN)

(73) Assignee: Xi'an University of Architecture and Technology, Shaanxi (CN)

( * ) Notice: Subject to any disclaimer, the term of this patent is extended or adjusted under 35 U.S.C. 154(b) by 364 days.

(21) Appl. No.: 17/489,812

(22) Filed: Sep. 30, 2021

(65) Prior Publication Data

US 2022/0111979 A1   Apr. 14, 2022

(30) Foreign Application Priority Data

Oct. 10, 2020   (CN) .......................... 202011079368.3

(51) Int. Cl.
*B64G 1/10* (2006.01)
*H04W 28/16* (2009.01)
(Continued)

(52) U.S. Cl.
CPC ......... *B64G 1/1021* (2013.01); *B64G 1/1007* (2013.01); *G06F 9/4881* (2013.01);
(Continued)

(58) Field of Classification Search
CPC .. B64G 1/1021; B64G 1/1007; B64G 1/1085; G06F 9/4881; G06F 9/5061; G06F 2209/506; H04W 28/16; H04B 7/18519
See application file for complete search history.

(56) References Cited

U.S. PATENT DOCUMENTS

| 2015/0092597 A1* | 4/2015 | Guo ........................ H04L 41/12 370/254 |
| 2023/0137711 A1* | 5/2023 | Mukae ................... G06Q 50/10 244/158.4 |

FOREIGN PATENT DOCUMENTS

| CN | 106209210 A | 12/2016 |
| CN | 107682068 A | 2/2018 |
| CN | 108053051 A | 5/2018 |

OTHER PUBLICATIONS

The First Office Action in counterpart Chinese Application No. 202011079368.3, dated Jan. 6, 2022.
(Continued)

*Primary Examiner* — Will W Lin

(57) ABSTRACT

Disclosed is a method for task planning of a space information network based on resource interchange. The method includes: initializing basic parameters of the space information network; dividing a planning horizon into K time slots of equal length, and constructing a resource time-varying graph for the space information network; sampling a feasible resource combination space of each task, and obtaining a candidate resource combination set comprised of the resource combinations with independence greater than or equal to a threshold n; calculating a conflict relation between resource combinations, and constructing a resource combination conflict graph; obtaining a maximum independent set of the resource combination conflict graph to obtain a global planning result; and searching a neighborhood of the global planning result, and completing a local adjustment of a task planning scheme through the resource interchange, to complete the task planning based on characteristics of the resource interchange.

6 Claims, 7 Drawing Sheets

(51) Int. Cl.
*G06F 9/50* (2006.01)
*G06F 9/48* (2006.01)

(52) U.S. Cl.
CPC .......... *G06F 9/5061* (2013.01); *H04W 28/16* (2013.01); *G06F 2209/506* (2013.01)

(56) References Cited

OTHER PUBLICATIONS

The Notification to Grant Patent Right for Invention in counterpart Chinese Application No. 202011079368.3, dated Mar. 7, 2022.
Runzi Liu, "Capacity Analysis and Resource Management of Space Information Networks", Chinese Doctoral Dissertations Full-text Database, Information Technology Series, No. 1, pp. 21-45 and pp. 71-74, Jan. 15, 2019.
Di Zhou, "Mission-Oriented Resource Management Technology in Space Information Networks", Chinese Doctoral Dissertations Full-text Database, Information Technology Series, No. 2, p. 43, Feb. 15, 2020.

\* cited by examiner

METHOD FOR TASK PLANNING OF SPACE INFORMATION NETWORK BASED RESOURCE INTERCHANGE

CROSS-REFERENCE TO RELATED APPLICATION

The present disclosure claims priority to Chinese Patent Application No. 202011079368.3 filed on Oct. 10, 2020, which is hereby incorporated by reference in its entirety.

TECHNICAL FIELD

The present disclosure belongs to the field of space information technologies, and relates to a method for task planning of a space information network based on resource interchange.

BACKGROUND

The space information network is a network system that uses space platforms such as satellites as carriers to obtain, transmit and process space information in real time. In view of its significant advantages such as wide coverage, flexible networking, and freedom from geographical environment restrictions, the space information network has played an important role in the military and civilian fields in recent years. However, due to a wide variety of tasks and resources in the space information network, and characteristics such as dynamic randomness and non-uniformity of the temporal and spatial distribution of the tasks and resources in the space information network, the phenomenon of shortages of certain resources in some time periods and space of the network occurs from time to time, which causes some tasks in the network to be unable to be processed in time, thereby greatly limiting the performance of the space information network. In the face of ever-increasing task demands, it is important to reasonably schedule limited resources to solve a great task demand timely.

By using inherent properties such as resource mobility in the space information network and emerging technologies such as a wireless software-defined payload, it is possible to replace or transform scarce resources with idle resources, thereby providing conditions for improving resource utilization efficiency and ensuring effective completion of tasks. Currently, some researches have been carried out on the resource mobility in the space information network such as resource interchange and resource aggregation, and management methods for network resources are provided based on a characteristic of the resource interchange of the space information network.

However, existing methods also have certain shortcomings. First, these methods only qualitatively use the characteristic of the resource interchange of the space information network, and do not quantitatively give conditions for the interchange of resource combinations. Second, the discontinuity of network resources and task requirements leads to a complex combination optimization problem in task planning of the space information network. Although the resource interchange greatly increases matching freedom between resource combinations and tasks, the resource interchange also greatly increases a range of feasible solution space, thereby significantly increasing the computational complexity of obtaining the optimal solution. Existing work mostly considers a problem of simple scenarios with a limited number of satellites and limited types of resources, or designing heuristic algorithms to split the original combinational optimization problem into several sub-problems from a dimension of time or a task execution stage, while ignores a correlation between resources.

SUMMARY

The present disclosure aims to overcome the above defects in the related art, and provides a method for task planning of a space information network based on resource interchange, capable of reducing the computational the complexity of the task planning while increasing a task completion rate.

In order to achieve the above objects, the method for the task planning of the space information network based on resource interchange provided by the present disclosure includes the following steps of:

1) initializing basic parameters of the space information network;
2) dividing a planning horizon into K time slots of equal length, where a length of each time slot is ti, and constructing a resource time-varying graph $G_K(V, A)$ for the space information network, where V and A respectively represent a set of vertices and a set of resource arcs in the resource time-varying graph;
3) sampling the feasible resource combination space of each task $om_i \in OM$, and obtaining a candidate resource combination set, denoted by $P_i$, comprised of the resource combinations with independence greater than or equal to a threshold n;
4) calculating the conflict relation among resource combinations, and constructing a resource combination conflict graph $RCG(P_C, E_C)$, where $P_C$ and $E_C$ respectively represent a set of vertices and a set of edges of the resource combination conflict graph;
5) obtaining the maximum independent set of the resource combination conflict graph, and completing large-scale global task planning based on a candidate resource combination set, to obtain a global planning result; and
6) searching the neighborhood of the global planning result, and completing a local adjustment of a task planning scheme through the resource interchange, to complete the task planning based on characteristics of the resource interchange.

The basic parameters of the space information network include a set of Earth observation satellites OS, a set of relay satellites RS, a set of ground stations GS, a data processing center dc, a set of observation targets OB, a set of tasks OM, and a planning horizon T.

Specifically, step 4) includes:
4a) adding each candidate resource combination in set $P_{se} = \mathring{A}_{1 \le i \le |OM|} P_i$ as a vertex in the resource combination conflict graph; and
4b) for any pair of vertices $p_{i,k}$ and $p_{j,l}$ in the resource combination conflict graph, adding an edge between the vertices $p_{i,k}$ and $p_{j,l}$ if resource combinations $p_{i,k}$ and $p_{j,l}$ have a conflict relation or satisfy i=j and k≠l, where $p_{i,k}$ represents the k-th candidate resource combination of the task $om_i$.

Specifically, step 5) includes:
5a) initializing output set $P_{su} = \emptyset$;
5b) sorting all vertices in $P_C$ based on their degree in a descending order, and selecting a vertex $p_0$ with the largest degree;
5c) adding the vertex $p_0$ with the largest degree to output set $P_{su}$;

5d) deleting vertex $p_0$ and all the vertices adjacent to $p_0$ from $P_C$, and deleting all the edges associated with the deleted vertices from $E_C$; and 5e) proceeding to step 5b) when $P_C \neq \emptyset$; otherwise, outputting the set $P_{su}$, and obtaining, based on $P_{su}$, a set of planned tasks and a resource allocation scheme of the planned tasks.

Specifically, step 6) includes:

6a) obtaining the resource time-varying graph $G_K(V, A)$ and its subgraph $G_K'(V', A')$ by removing the resource arcs represented by the resources occupied by the planned tasks, and obtaining the set of tasks that is successfully planned, denoted by $OM_y$, and the set of tasks that has not been planned, denoted by $OM_w$;

6b) calculating resource shortage degrees of all tasks in $OM_w$ and sorting the resource shortage degrees from high to low;

6c) initializing a counter n=1;

6d) finding an idle resource for the n-th task $om_n$ in $OM_w$ through the resource interchange;

6e) increasing the counter n by 1; and 6f) proceeding to step 6d) when n is smaller than or equal to $|OM_w|$; otherwise, outputting task set $OM_y$.

Specifically, step 6d) includes:

6d1) finding a feasible resource combination with the least resources occupied by a planned task for the task $om_n$, which is denoted by $Pd_n$, and using $Pz_n$ to represent the set of resources in $Pd_n$ and occupied by the planned tasks;

6d2) traversing each resource arc $a \in Pz_n$; for the task that occupies the resource arc a, denoted by fom(a), re-allocating a new resource combination for fom(a) through resource interchange, so that the resource arc a is no longer occupied; and if the resource interchange succeeds, updating $G_K'(V', A')$, and deleting a resource a from the set of resources $Pz_n$; otherwise, skipping to step 6e); and 6d3) finding a path from $ob_n^{\lceil ts_n/\tau \rceil}$ to $dc^{\lfloor te_n/\tau \rfloor}$ in $G_K'(V', A')$ as the new resource combination allocated to task $om_n$, denoted by $p_n$, updating $G_K'(V', A')$, and adding the task $om_n$ to the set of tasks $OM_y$ that is successfully planned.

The present disclosure has the following beneficial effects.

During specific operations, the method for the task planning of the space information network based on resource interchange of the present disclosure, based on a mechanism of space information resource interchange, converts non-scarce resources into scarce resources based on the scarcity of task resources, such that the scarce resources can be released, thereby improving a resource utilization rate and enhancing task execution efficiency of the space information network. In addition, on a basis of the resource time-varying graph, a task planning problem in the space information network is transformed into a flow problem in graph theory. According to a relation between resource combinations and a degree of independence of the resource combinations, a task planning process is divided into two stages: large-scale global optimization and a small-scale local adjustment, such that an integer linear programming problem is simplified, and a feasible resource combination space of each task is sampled to obtain a set of independent resource combinations. The set of independent resource combinations is used as an optimization space for global task planning to reduce the complexity of global optimization.

DESCRIPTION OF EMBODIMENTS

The present disclosure will be further described in detail below in combination with the accompanying drawings.

Figure 1:
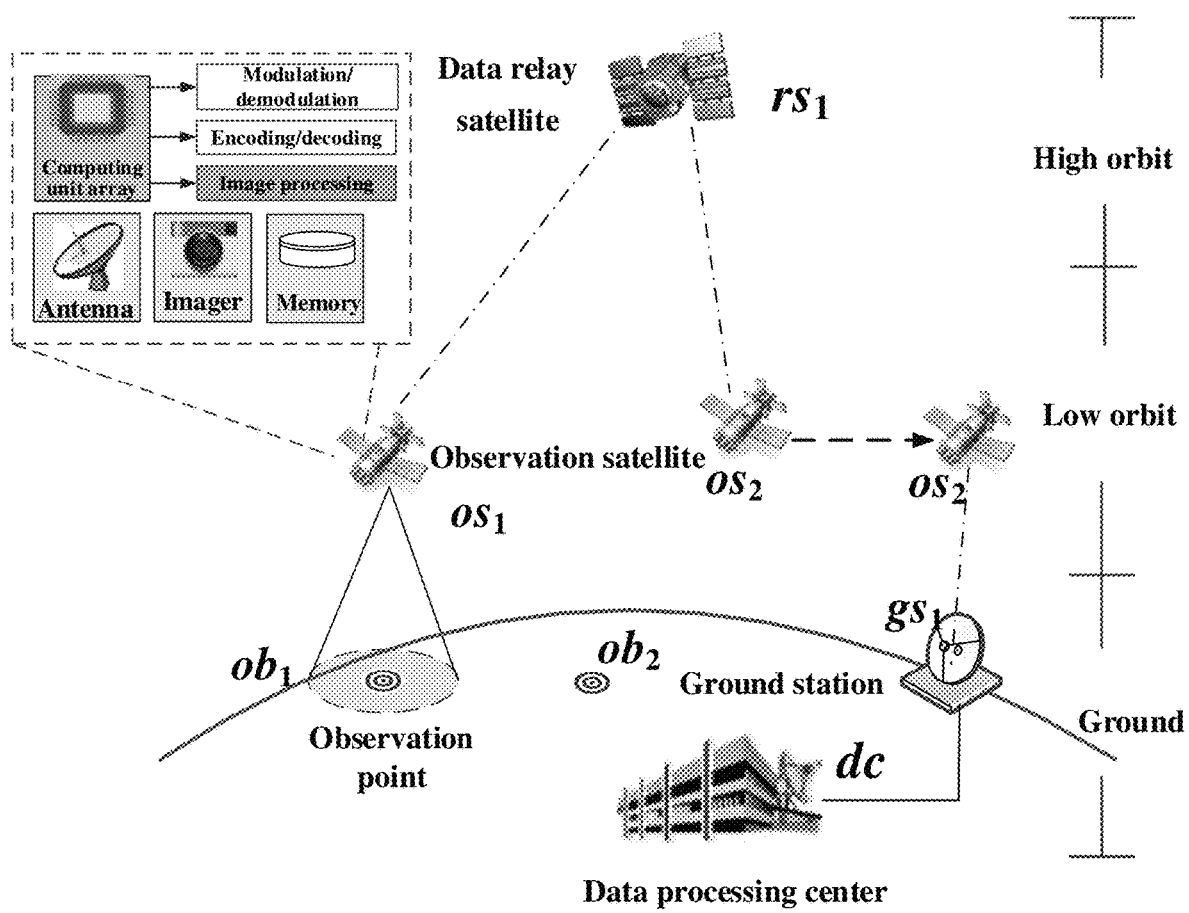
FIG. 1 is a schematic diagram illustrating a scenario used by the present disclosure.
Figure 2:
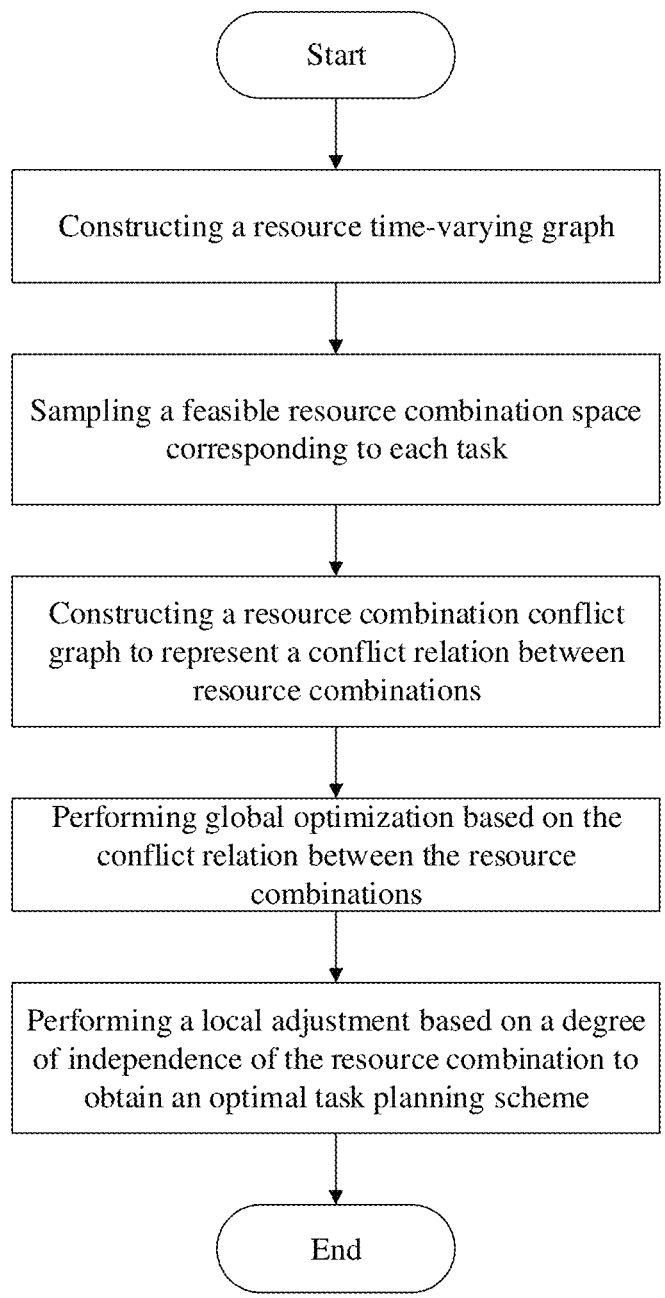
FIG. 2 is an overall flowchart of the present disclosure.
Figure 3:
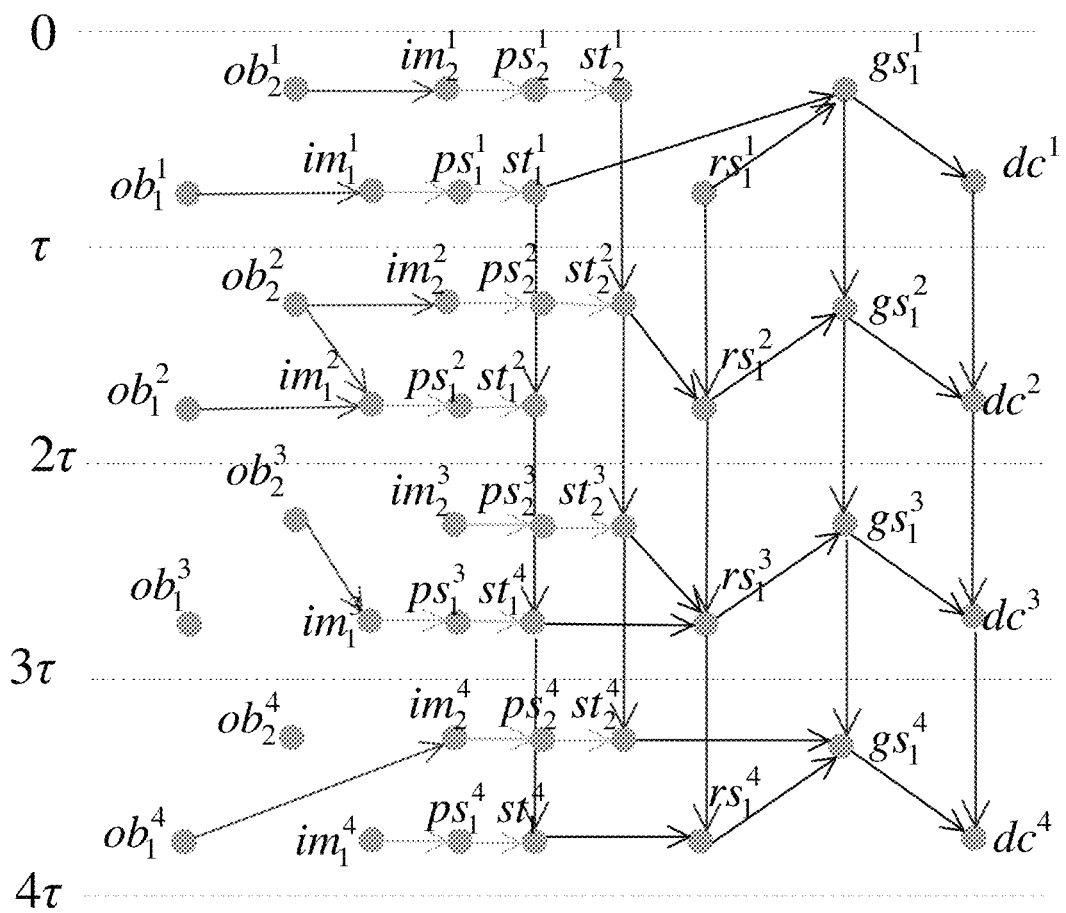
FIG. 3 is a resource time-varying diagram in the present disclosure.

With reference to FIG. 1 and FIG. 2, a method for task planning of a space information network based on resource interchange according to the present disclosure includes the following steps.

At step 1), basic parameters of the space information network are initialized.

The basic parameters of the space information network include a set of Earth observation satellites $OS=\{os_1, os_2, \ldots\}$, a set of relay satellites $RS=\{rs_1, rs_2, \ldots\}$, a set of ground stations $GS=\{gs_1, gs_2, \ldots\}$, a data processing center dc, a set of observation targets $OB=\{ob_1, ob_2, \ldots\}$, a set of tasks $OM=\{om_1, om_2, \ldots\}$ and a planning horizon T.

At step 2), a planning horizon T is divided into K time slots of equal length, where a length of each time slot is $\tau$, and a resource time-varying graph $G_K(V, A)$ for the space information network is constructed, where V and A respectively represent the set of vertices and the set of resource arcs in the resource time-varying graph. The resource time-varying graph $G_K(V, A)$ for the space information network is a K-layered directed graph.

The set of vertices V in the resource time-varying graph contains a set of duplicates of all nodes in the space information network in different time slots. That is, $V=V_{OB} \cup V_{IM} \cup V_{PS} \cup V_{ST} \cup V_{RS} \cup V_{GS} \cup V_{DC}$, where $V_{OB}$, $V_{IM}$, $V_{PS}$, $V_{ST}$, $V_{RS}$, $V_{GS}$ and $V_{DC}$ respectively correspond to a set of duplicate vertices in each time slot of observation targets, observation satellite imagers, processors, transceivers and storage units, relay satellites, ground stations and data processing center.

The set of resource arcs A in the resource time-varying graph contains different types of resources in a network. That is, $A=A_O \cup A_L \cup A_S \cup A_C$, where $A_O$, $A_L$, $A_S$, and $A_C$ respectively represent a set of observation arcs, a set of transmission arcs, a set of storage arcs, and a set of calculation arcs.

At step 3), the feasible resource combination space of each task $om_i \in OM$ is sampled, and a set of resource combinations $P_i$ with independence greater than or equal to a threshold n is determined as a candidate resource combination set.

Specifically, step 3) includes the following steps.

At step 3a), obtaining a set of resources in which the maximum degree of independence of each task $om_i$ is not smaller than n is modeled as an optimization problem:

$$P1: \max \sum_{p \in P_{a,i}} x_p.$$

That is, the number of elements in the candidate resource combination set is maximized, where $P_{a,i}$ represents a set of all feasible resource combinations of the task $om_i$, and $x_p$ represents a Boolean variable.

At step 3a1), constraint C1 is added to restrict that the same resource can only be used by one resource combination in n time slots. That is, independence between any two resource combinations with $x_p=1$ is at least n:

$$C1: Z(p_1, p_2) \geq n, \forall \, p_1, p_2 \in \{p \mid x_p = 1, p \in P_{a,i}\};$$

At step 3a2), constraint C2 is added. $x_p$ being equal to 1 means that a resource combination p is within the set of candidate resources; otherwise, the resource combination p is not within the set of candidate resources:

$$C2: x_p \in \{0, 1\}.$$

Figure 4:
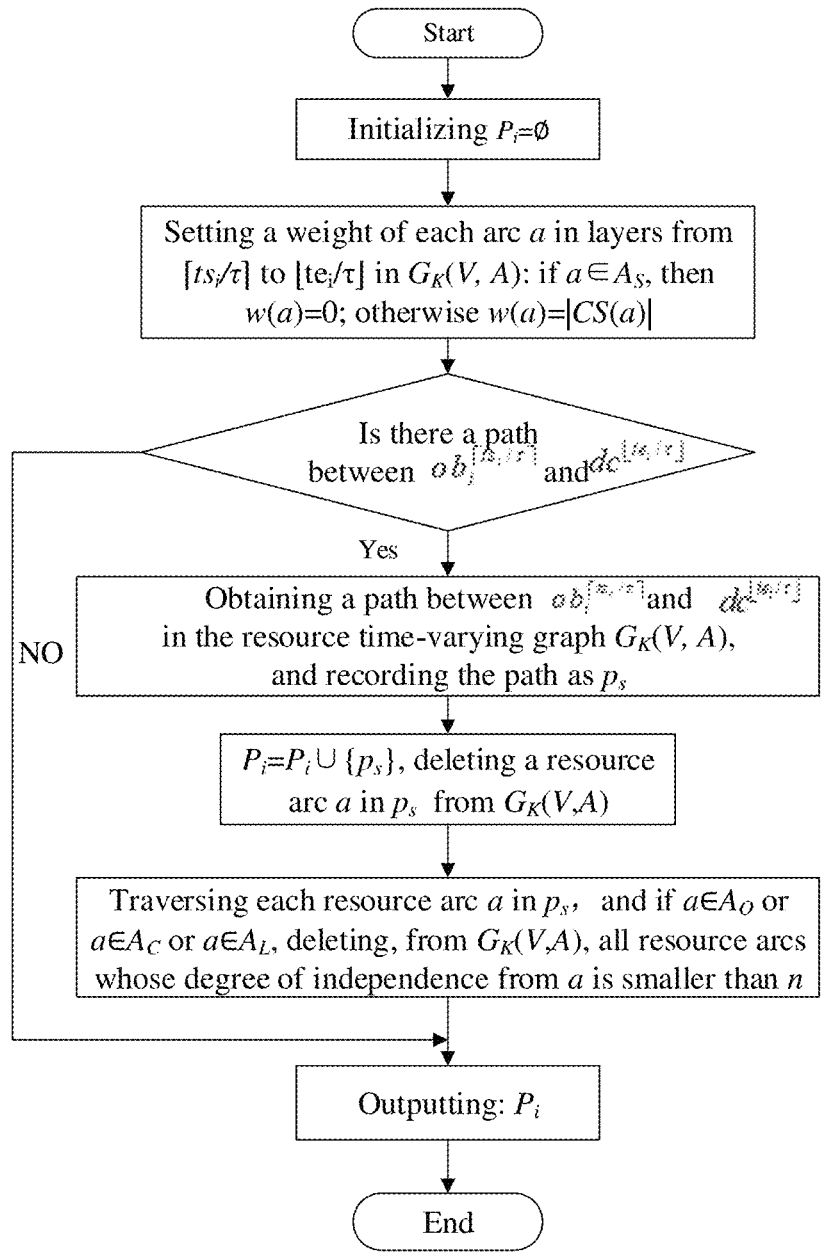
FIG. 4 is a flowchart illustrating a sampling algorithm of a resource combination.

Referring to FIG. 4, a resource combination sampling algorithm is designed based on the optimization problem P1 in 3a):

At step 3b), $P_i=\emptyset$ is initialized.

At step 3c), each resource arc a in a time slot from $\lceil ts_i/\tau \rceil$ to $\lfloor te_i/\tau \rfloor$ in the resource time-varying graph is traversed. If a is a storage arc, a weight w(a) of the resource arc a is set to 0; otherwise, w(a) is set to the number of resource arcs whose degree of independence from a is smaller than n.

At step 3d) a shortest path from a source node $ob_i^{\lceil ts_i/\tau \rceil}$ to a destination node $dc^{\lfloor te_i/\tau \rfloor}$ on the resource time-varying graph is obtained and recorded as $p_s$. Let $P_i = P_i \cup \{p_s\}$.

At step 3e), each resource arc a in $p_s$ is traversed. If a is an observation arc, a calculation arc or a transmission arc, all resource arcs whose degree of independence from a is smaller than n are deleted from $G_K(V, A)$.

At step 3f), if there is still a path between $ob_i^{\lceil ts_i/\tau \rceil}$ and $dc^{\lfloor te_i/\tau \rfloor}$ in the resource time-varying graph, skip to step 3c); otherwise, output a candidate resource combination $P_i$.

At step 4), a conflict relation between resource combinations is calculated, and a resource combination conflict graph RCG ($P_C$, $E_C$) is constructed, where $P_C$ and $E_C$ respectively represent a set of vertices and a set of edges of the resource combination conflict graph.

Specifically, step 4) includes the following steps.

At step 4a), $p_{i,k}$ is set as representing the k-th candidate resource combination of task $om_i$. For resource combinations $p_{i,k}$ and $p_{j,l}$, if one of the following conditions is met:
(i) resources $(v_{m1}^r, v_{n1}^r) \in p_{i,k}$ and $(v_{m2}^t, v_{n2}^t) \in p_{j,l}$ existing, and $v_{m1}^r = v_{m2}^t$ $v_{m1}^r \in V_{ST}$ being satisfied; and
(ii) resources $(v_{m1}^r, v_{n1}^r) \in p_{i,k}$ and $(v_{m2}^t, v_{n2}^t) \in p_{j,l}$ existing, and $v_{n1}^r = v_{n2}^t$ $v_{n1}^r \in V_{IM} \cup V_{RS} \cup V_{GS}$ being satisfied;

The resource combinations $p_{i,k}$ and $p_{j,l}$ are defined to conflict with each other.

Figure 5:
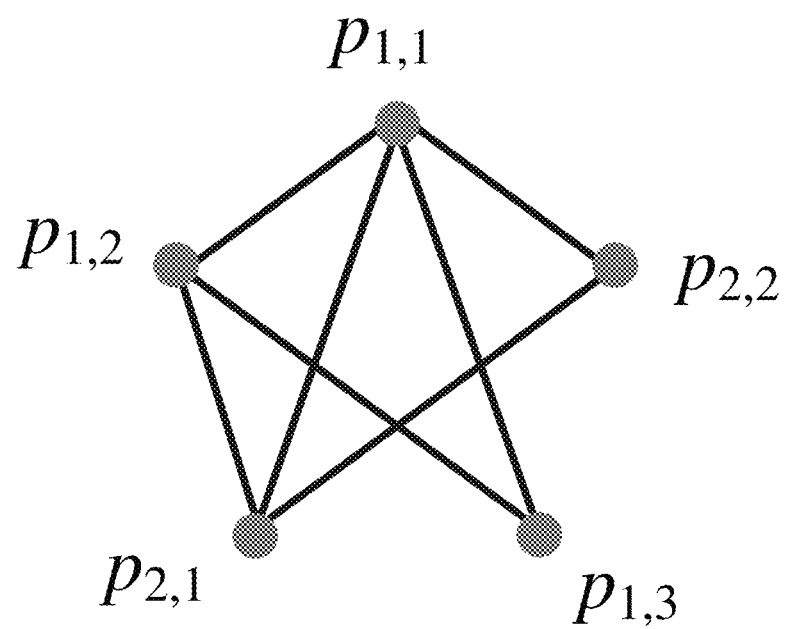
FIG. 5 is a resource combination conflict diagram in the present disclosure.

At step 4b), the resource combination conflict graph RCG ($P_C$, $E_C$) as illustrated in FIG. 5 is constructed based on the conflict relationship between the resource combinations at step 4a), where $P_C$ and $E_C$ respectively represent the set of vertices and the set of edges of the resource combination conflict graph. Specifically, step 4b) includes the following steps.

At step 4b1), the candidate resource combination in a set $p_{se} = \cup_{1 \leq i \leq |OM|} P_i$ is added as a vertex in the resource combination conflict graph.

At step 4b2), for any pair of vertices ($p_{i,k}$ and $p_{j,l}$) in the resource combination conflict graph, if resource combinations $p_{i,k}$ and $p_{j,l}$ conflict with each other, or $i=j$ and $k \neq l$, an edge is added between vertices $p_{i,k}$ and $p_{j,l}$.

At step 5), a maximum independent set of the resource combination conflict graph is obtained, and large-scale global task planning based on a candidate resource combination is completed, to obtain a global planning result.

Figure 6:
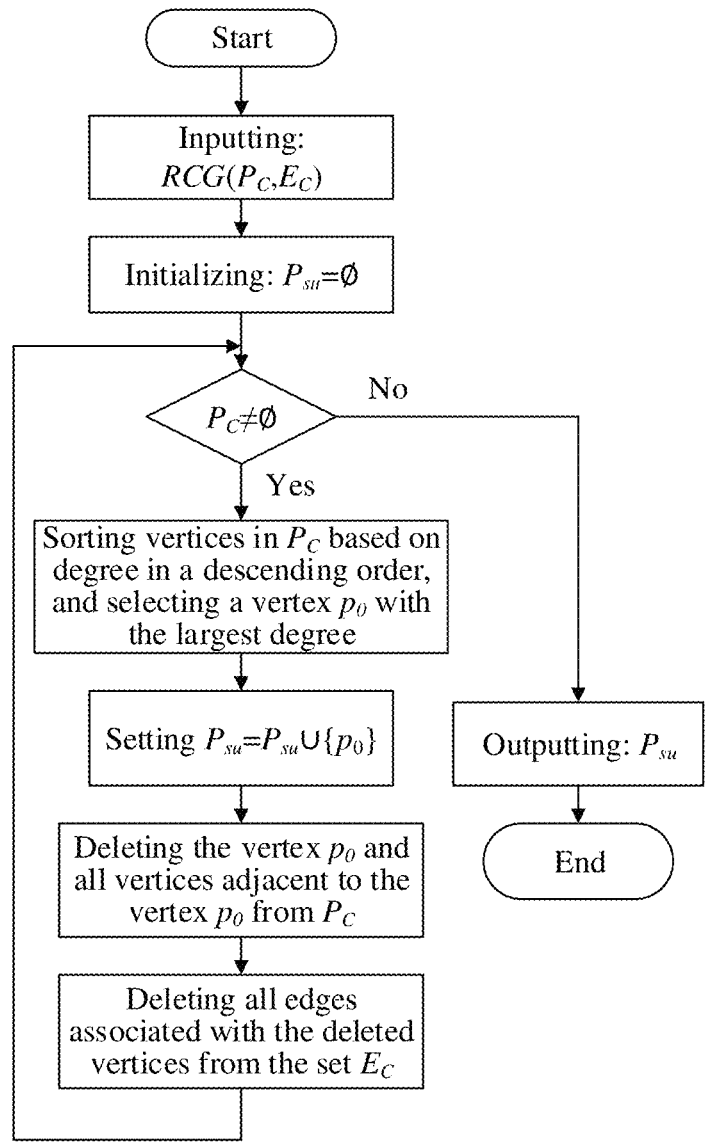
FIG. 6 is a flowchart illustrating an algorithm for completing a large-scale global task planning based on a conflict relation between candidate resource combinations.

Specifically, referring to FIG. 6, step 5) includes the following steps.

At step 5a), output set $P_{su}=\emptyset$ is initialized.

At step 5b), all vertices in $P_C$ are sorted based on their degree in a descending order, and a vertex $p_0$ with the largest degree is selected.

At step 5c), the vertex $p_0$ with the largest degree is added to output set $P_{su}$.

At step 5d), the vertex $p_0$ and all the vertices adjacent to the vertex $p_0$ are deleted from $P_C$, and all the edges associated with the deleted vertices are deleted from $E_C$.

At step 5e), if $P_C \neq \emptyset$, the method proceeds to step 5b); otherwise, the set $P_{su}$ is outputted, and a set of planned tasks and a resource allocation scheme of the planned tasks are obtained based on $P_{su}$.

At step 6), a neighborhood of the global planning result is searched, and a local adjustment of a task planning scheme is completed through the resource interchange, to complete the task planning based on characteristics of the resource interchange.

Specifically, step 6) includes the following steps.

At step 6a), the resource time-varying graph $G_K(V, A)$ and its subgraph $G_K'(V', A')$ that has removed the resource arcs represented by the resources occupied by planned tasks are obtained, and the set of tasks that are successfully planned and the set of tasks that have not been planned, which are respectively denoted by $OM_y$ and $OM_w$, are obtained.

At step 6b), resource shortage degrees of all tasks in $OM_w$ are calculated, and the resource shortage degrees are sorted from high to low.

The minimum number of resources occupied by all feasible task combinations of the task $om_i$ is defined as the resource shortage degree $$\eta_i = \min_{p_{i,k} \in P_i} \eta_{i,k}$$

of the task, where $\eta_{i,k}$ represents the number of resources occupied by the planned task for the k-th resource combination of $om_i$. A specific process of obtaining the resource shortage degree is as follows.

At step 6b1), weights are assigned to the observation arcs, storage arcs, and calculation arcs on the resource time-varying graph $G_K(V, A)$. If a resource corresponding to the arc is already occupied by the planned task, the weight of the arc is assigned to 1; otherwise, the weight is assigned to 0.

At step 6b2), a path between $ob_i^{\lceil ts_i/\tau \rceil}$ and $dc^{\lfloor te_i/\tau \rfloor}$ is obtained by using a shortest path algorithm. A path length is the resource shortage degree $\eta_i$ of the task.

Figure 7:
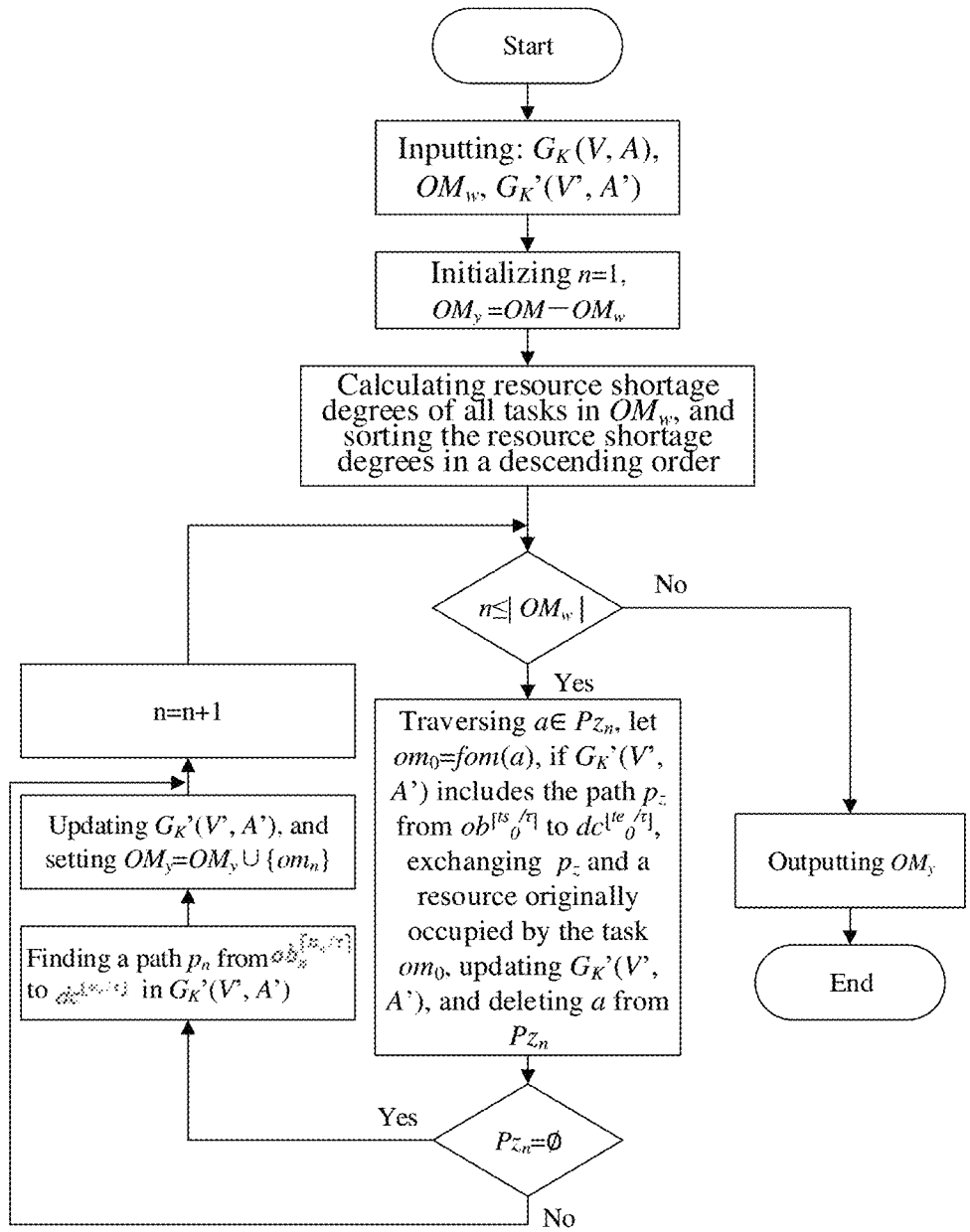
FIG. 7 is a flowchart illustrating an algorithm for completing a local adjustment of a task planning scheme based on resource interchange.

On a basis of the resource shortage degree obtained in (6b), the algorithm as illustrated in FIG. 7 for completing the local adjustment of the task planning scheme based on the resource interchange is designed.

At step 6c), a counter n=1 is initialized.

At step 6d), an idle resource for the n-th task $om_n$ in $OM_w$ is found through the resource interchange.

At step 6e), the counter n is increased by 1.

At step 6f), if n is smaller than or equal to $|OM_w|$, the method proceeds to step 6d); otherwise, task set $OM_y$ is outputted.

Specifically, step 6d) includes the following steps.

At step 6d1), a feasible resource combination $Pd_n$ with the least resources occupied by planned tasks for the task $om_n$ is found, and $Pz_n$ denotes the set of resources occupied by the planned tasks and in $Pd_n$.

At step 6d2), each resource arc $a \in Pz_n$ is traversed. For a task fom(a) that occupies the resource arc a, a new resource combination for the task fom(a) is re-allocated through the resource interchange, so that the resource arc a is no longer occupied. If the resource interchange succeeds, $G_K'(V', A')$ is updated, and a resource a is deleted from the set of resources $Pz_n$; otherwise, skip to step 6e).

At step 6d3), a path $p_n$ from $ob_n^{\lceil ts_n/\tau \rceil}$ and $dc^{\lfloor te_n/\tau \rfloor}$ is found in $G_K'(V', A')$ as the new resource combination allocated to task $om_n$, $G_K'(V', A')$ is updated, and task $om_n$ is added to set $OM_y$.

The above description is only a specific example of the present disclosure. Obviously, it is possible for those skilled in the art to make various modifications and changes in form and details without departing from the principle and structure of the present disclosure after understanding the content and principle of the present disclosure. However, these modifications and changes based on the concept of the present disclosure are still within the protection scope of the attached claims of the present disclosure.

What is claimed is:

1. A method for task planning of a space information network based on resource interchange, comprising:
   step 1: initializing basic parameters of the space information network;
   step 2: dividing a planning horizon into K time slots of equal length, where a length of each time slot is ti, and constructing a resource time-varying graph $G_K(V, A)$ for the space information network, where V and A respectively represent a set of vertices and a set of resource arcs in the resource time-varying graph;
   step 3: sampling a feasible resource combination space of each task $om_i \in OM$, and obtaining a candidate resource combination set, denoted by $P_i$, comprised of the resource combinations with independence greater than or equal to a threshold n;
   step 4: calculating a conflict relation between resource combinations, and constructing a resource combination conflict graph $RCG(P_C, E_C)$, where $P_C$ and $E_C$ respectively represent a set of vertices and a set of edges of the resource combination conflict graph;
   step 5: obtaining a maximum independent set of the resource combination conflict graph, and completing large-scale global task planning based on a candidate resource combination, to obtain a global planning result; and
   step 6: searching a neighborhood of the global planning result, and completing a local adjustment of a task planning scheme through the resource interchange, to complete the task planning based on characteristics of the resource interchange.

2. The method according to claim 1, wherein the basic parameters of the space information network comprise a set of Earth observation satellites OS, a set of relay satellites RS, a set of ground stations GS, a data processing center dc, a set of observation targets OB, a set of tasks OM, and a planning horizon T.

3. The method according to claim 1, wherein the step 4 comprises:
   step 4a: adding each candidate resource combination in set $p_{se} = \cup_{1 \leq i \leq |OM|} P_i$ as a vertex in the resource combination conflict graph; and
   step 4b: for any pair of vertices $p_{i,k}$ and $p_{j,l}$ in the resource combination conflict graph, adding an edge between vertices $p_{i,k}$ and $p_{j,l}$ when resource combinations $p_{i,k}$ and $p_{j,l}$ have a conflict relation or satisfy i=j and k≠l, where $p_{i,k}$ represents a k-th candidate resource combination of the task $om_i$.

4. The method according to claim 1, wherein the step 5 comprises:
   step 5a: initializing an output set $P_{su} = \emptyset$;
   step 5b: sorting all vertices in $P_C$ based on respective degrees in a descending order, and selecting a vertex $p_0$ with the largest degree;
   step 5c: adding the vertex $p_0$ with the largest degree to the output set $P_{su}$;
   step 5d: deleting vertex $p_0$ and all the vertices adjacent to $p_0$ from $P_C$, and deleting all the edges associated with the deleted vertices from $E_C$; and
   step 5e: proceeding to the step 5b if $P_C \neq \emptyset$; otherwise, outputting the set $P_{su}$, and obtaining, based on $P_{su}$, a set of planned tasks and a resource allocation scheme of the planned tasks.

5. The method according to claim 1, wherein the step 6 comprises:
   step 6a: obtaining the resource time-varying graph $G_K(V, A)$ and a subgraph $G_K'(V', A')$ that has removed resource arcs represented by resources occupied by planned tasks, and obtaining a set of tasks $OM_y$ that is successfully planned and a set of tasks $OM_w$ that has not been planned;
   step 6b: calculating resource shortage degrees of all tasks in $OM_w$, and sorting the resource shortage degrees from high to low;
   step 6c: initializing a counter n=1;
   step 6d: finding an idle resource combination for the n-th task $om_n$ in $OM_w$ through the resource interchange;
   step 6e: increasing the counter n by 1; and
   step 6f: proceeding to the step 6d when n is smaller than or equal to $|OM_w|$; otherwise, outputting the set of tasks $OM_y$.

6. The method according to claim 5, wherein the step 6d comprises:
   step 6d1: finding a feasible resource combination $Pd_n$ with the least resources occupied by planned tasks for task $om_n$, and setting $Pz_n$ as representing a set of resources occupied by the planned tasks and in $Pd_n$;
   step 6d2: traversing each resource arc $a \in Pz_n$; for the task that occupies resource arc a, denoted by fom(a), re-allocating a new resource combination for fom(a) through resource interchange, so that the resource arc a is no longer occupied; and if the resource interchange succeeds, updating $G_K'(V, A')$, and deleting resource a from $Pz_n$; otherwise, skipping to the step 6e; and
   step 6d3: finding a path $p_n$ from $ob_n^{\lceil ts_n/\tau \rceil}$ and $dc^{\lfloor te_n/\tau \rfloor}$ in $G_K'(V', A')$ as the new resource combination allocated to task $om_n$, updating $G_K'(V', A')$, and adding task $om_n$ to the set $OM_y$.

* * * * *